United States Patent
Arora et al.

(10) Patent No.: US 10,778,589 B2
(45) Date of Patent: Sep. 15, 2020

(54) INTELLIGENT RAN FLOW MANAGEMENT AND DISTRIBUTED POLICY ENFORCEMENT

(71) Applicant: Parallel Wireless, Inc., Nashua, NH (US)

(72) Inventors: Jitender Arora, Westford, MA (US); Yang Cao, Westford, MA (US); Zeev Lubenski, North Andover, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/640,429

(22) Filed: Jun. 30, 2017

(65) Prior Publication Data
US 2018/0006954 A1    Jan. 4, 2018

Related U.S. Application Data

(60) Provisional application No. 62/356,781, filed on Jun. 30, 2016.

(51) Int. Cl.
*H04L 12/813* (2013.01)
*H04L 12/26* (2006.01)
(Continued)

(52) U.S. Cl.
CPC .......... *H04L 47/20* (2013.01); *H04L 12/1407* (2013.01); *H04M 15/31* (2013.01);
(Continued)

(58) Field of Classification Search
CPC ....... H04W 4/70; H04W 28/10; H04W 88/08; H04W 84/042; H04W 88/16; H04W 4/24;
(Continued)

(56) References Cited

U.S. PATENT DOCUMENTS

| 7,562,213 | B1 | 7/2009 | Timms |
| 9,717,057 | B2 | 7/2017 | Zhang et al. |

(Continued)

FOREIGN PATENT DOCUMENTS

| EP | 1654625 B1 | 5/2006 |
| WO | 2012044148 A1 | 4/2012 |

(Continued)

OTHER PUBLICATIONS

Arora et. al., EP 3 479 522A1, Jun. 30, 2017 https://patents.google.com/patent/EP3479522A1/en.*

(Continued)

*Primary Examiner* — Maharishi V Khirodhar
*Assistant Examiner* — Kenneth P Hunt
(74) *Attorney, Agent, or Firm* — MIchael Y. Saji; David W. Rouille

(57) ABSTRACT

A system is disclosed for providing configurable flow management, comprising: a first base station coupled to a user device and with an established control connection with the user device; and a coordinating node coupled to the first base station and coupled to a core network, thereby providing a gateway for the first base station and the user device to the core network, the core network further comprising a policy and charging rules function (PCRF) node with a database of policy rules, wherein the coordinating node is configured to retrieve policy rules from the PCRF node, to enable enforcement of retrieved policy rules on flows from the user device passing through the coordinating node, and to transmit policy rules to the first base station for enforcement at the first base station.

18 Claims, 6 Drawing Sheets

(51) Int. Cl.
*H04M 15/00* (2006.01)
*H04W 28/10* (2009.01)
*H04W 4/00* (2018.01)
*H04W 84/04* (2009.01)
*H04W 88/08* (2009.01)
*H04W 88/16* (2009.01)
*H04L 12/14* (2006.01)
*H04W 4/24* (2018.01)
*H04W 28/08* (2009.01)
*H04W 4/70* (2018.01)
*H04L 12/24* (2006.01)

(52) U.S. Cl.
CPC ............ *H04M 15/66* (2013.01); *H04W 4/24* (2013.01); *H04W 4/70* (2018.02); *H04W 28/08* (2013.01); *H04W 28/10* (2013.01); *H04L 41/0893* (2013.01); *H04L 43/028* (2013.01); *H04W 84/042* (2013.01); *H04W 88/08* (2013.01); *H04W 88/16* (2013.01)

(58) Field of Classification Search
CPC ...... H04M 15/66; H04L 47/20; H04L 43/028; H04L 12/14; H04L 12/1407
See application file for complete search history.

(56) References Cited

U.S. PATENT DOCUMENTS

| | | |
|---|---|---|
| 2002/0085512 A1 | 7/2002 | Lehtimaki et al. |
| 2003/0048791 A1 | 3/2003 | De Cnodder et al. |
| 2005/0026622 A1 | 2/2005 | Georgeaux et al. |
| 2005/0135243 A1 | 6/2005 | Lee et al. |
| 2008/0075003 A1 | 3/2008 | Lee et al. |
| 2008/0232304 A1 | 9/2008 | Mooney et al. |
| 2008/0273493 A1 | 11/2008 | Fong |
| 2009/0156213 A1* | 6/2009 | Spinelli ................ H04W 92/02 455/436 |
| 2010/0005178 A1 | 1/2010 | Sindelaru et al. |
| 2010/0150120 A1 | 6/2010 | Schlicht et al. |
| 2010/0234071 A1 | 9/2010 | Shabtay et al. |
| 2010/0284327 A1* | 11/2010 | Miklos ................ H04L 41/0893 370/328 |
| 2011/0225280 A1* | 9/2011 | Delsesto ................ H04W 28/18 709/223 |
| 2012/0039175 A1* | 2/2012 | Sridhar ................ H04L 47/125 370/236 |
| 2012/0059942 A1* | 3/2012 | Hu ........................ H04M 15/66 709/227 |
| 2012/0144049 A1* | 6/2012 | Lopez Nieto ........... H04L 12/14 709/228 |
| 2012/0155298 A1 | 6/2012 | Yang et al. |
| 2013/0028092 A1 | 1/2013 | Tong et al. |
| 2013/0044646 A1* | 2/2013 | Qu ...................... H04M 15/765 370/259 |
| 2013/0072146 A1 | 3/2013 | Smith |
| 2013/0336199 A1 | 12/2013 | Schwartz et al. |
| 2014/0044018 A1* | 2/2014 | Billau ................ H04L 12/1407 370/259 |
| 2014/0080492 A1 | 3/2014 | Shoshan et al. |
| 2014/0133456 A1 | 5/2014 | Donepudi et al. |
| 2014/0192643 A1 | 7/2014 | Kalapatapu et al. |
| 2014/0204754 A1 | 7/2014 | Jeong et al. |
| 2014/0335881 A1 | 11/2014 | Rubin et al. |
| 2015/0009822 A1 | 1/2015 | Du et al. |
| 2015/0045063 A1 | 2/2015 | Mishra et al. |
| 2015/0063101 A1 | 3/2015 | Touati et al. |
| 2015/0063218 A1 | 3/2015 | Kotecha et al. |
| 2015/0078280 A1 | 3/2015 | Lecroart et al. |
| 2015/0092688 A1 | 4/2015 | Jeong et al. |
| 2015/0103755 A1 | 4/2015 | Cui et al. |
| 2015/0173111 A1* | 6/2015 | Agarwal ................ H04W 8/04 370/329 |
| 2015/0195858 A1 | 7/2015 | Jin et al. |
| 2015/0229970 A1 | 8/2015 | Ma et al. |
| 2015/0257024 A1 | 9/2015 | Baid et al. |
| 2015/0312843 A1 | 10/2015 | Anchan et al. |
| 2015/0382386 A1 | 12/2015 | Castro Castro et al. |
| 2016/0277992 A1 | 9/2016 | Cao |
| 2016/0285776 A1 | 9/2016 | Gaist et al. |
| 2016/0352865 A1 | 12/2016 | Gupta et al. |
| 2016/0381594 A1* | 12/2016 | Tomici ................ H04M 15/66 370/236 |
| 2017/0013513 A1 | 1/2017 | Agarwal et al. |
| 2017/0118616 A1* | 4/2017 | Kothari ................ H04W 4/24 |
| 2017/0264488 A1 | 9/2017 | Ben Ami et al. |
| 2017/0366679 A1* | 12/2017 | Mohamed ............ H04M 15/43 |

FOREIGN PATENT DOCUMENTS

| | | | |
|---|---|---|---|
| WO | 2012120519 A1 | 9/2012 | |
| WO | 2013145592 A1 | 10/2013 | |
| WO | WO-2018006079 A1 * | 1/2018 | ............ H04W 4/70 |

OTHER PUBLICATIONS

International Searching Authority, International Preliminary Report on Patentability PCT/US2017/040528, dated Jan. 1 2019.*
3rd Generation Partnership Project, 3GPP TR 23.830 V9.0.0 (Sep. 2009), "3rd Generation Partnership Project; Technical Specification Group Services and System Aspects; Architecture Aspects of Home NodeB and Home eNodeB (Release 9)," Sep. 2009, V9.0.0.
3rd Generation Partnership Project, 3GPP TS 24.301 V8.1.0 (Mar. 2009), "3rd Generation Partnership Project; Technical Specification Group Core Network and Terminals; Non-Access-Stratum (NAS) protocol for Evolved packet System (EPS) Stage 3 (Release 8)," Mar. 2009, V8.1.0.
3rd Generation Partnership Project, 3GPP TS 32.453 V11.0.0 (Sep. 2011), "3rd Generation Partnership Project; Technical Specification Group Services and System Aspects; Telecommunication Management; Performance Management (PM); Performance Measurements Home Enhanced Node B (HeNB) Subsystem (HeNS) (Release 11)," Sep. 2011, V11.0.0.
3rd Generation Partnership Project, 3GPP TS 32.593 V11.0.0 (Sep. 2011), "3rd Generation Partnership Project; Technical Specification Group Services and System Aspects; Telecommunication Management; Home Enhanced Node B (HeNB) Operations, Administration, Maintenance and Provisioning (OAM&P); Procedure Flows for Type 1 Interface HeNB to HeNB Management Systems (HeMS) (Release 11)," Sep. 2011, V11.0.0.
3rd Generation Partnership Project, 3GPP TR 36.806 V9.0.0 (Mar. 2010), "3rd Generation Partnership Project; Technical Specification Group Access Network; Evolved Universal Terrestrial Radio Access (E-UTRA); Relay Architectures for E-UTRA (LTE-Advanced) (Release 9)," Mar. 2010, V9.0.0.
3rd Generation Partnership Project, 3GPP TR 36.826 V0.13.0 (Feb. 2012), "3rd Generation Partnership Project; Technical Specification Group TSG RAN; Evolved Universal Terrestrial Radio Access (E-UTRA); Relay Radio Transmission and Reception (Release 10)," Feb. 2012, V0.13.0.
3rd Generation Partnership Project, 3GPP TS 23.401 V13.7.0 (Jun. 2016), "3rd Generation Partnership Project; Technical Specification Group Services and System Aspects; General Packet Radio Service (GPRS) Enhancements for Evolved Universal Terrestrial Radio Access Network (E-UTRAN) Access (Release 13)," Jun. 2016, V13.7.0.
3rd Generation Partnership Project, 3GPP TS 23.401 V14.0.0 (Jun. 2016), "3rd Generation Partnership Project; Technical Specification Group Services and System Aspects; General Packet Radio Service (GPRS) Enhancements for Evolved Universal Terrestrial Radio Access Network (E-UTRAN) Access (Release 14)," Jun. 2016, V14.0.0.
3rd Generation Partnership Project, 3GPP TS 32.240 V8.6.0 (Jun. 2010), "3rd Generation Partnership Project; Technical Specification Group Services and System Aspects; Telecommunication Management; Charging Management; Charging Architecture and Principles (Release 8)," Jun. 2010, V8.6.0.

(56) References Cited

OTHER PUBLICATIONS

Institute of Electrical and Electronics Engineers, "IEEE Standard for Information technology—Telecommunications and information exchange between systems—Local and metropolitan area networks—Specific Requirements, Part 11: Wireless LAN Medium Access Control (MAC) and Physical Layer (PHY) Specifications," IEEE Computer Society, Revision of IEEE Std 802.11, Jun. 12, 2007.
Erik Dahlman et al., "Chapter 16—Relaying," 4G LTE/LTE-Advanced for Mobile Broadband—Kindle Edition, Mar. 21, 2011, pp. 331-345, paragraph 16.2.
European Telecommunication Standards Institute, ETSI TS 123 203 v12.6.0 (Sep. 2014), "Digital cellular telecommunications system (Phase 2+); Universal Mobile Telecommunications System (UMTS); LTE; Policy and charging control architecture (3GPP TS 23.203 version 12.6.0 Release 12)," V12.6.0 Sep. 2014.
European Telecommunication Standards Institute, ETSI TS 123 401 v12.8.0 (Apr. 2015), "LTE; General Packet Radio Service (GPRS) enhancements for Evolved Universal Terrestrial Radio Access Network (E-UTRAN) access (3GPP TS 23.401 version 12.8.0 Release 12)," V12.8.0, Apr. 2015.
"Evolved Packet Data Gateway Overview," ePDG Administration Guide, StarOS Release 20, pp. 1-90, retrieved from https://www.cisco.com/c/en/us/td/docs/wireless/asr_5000/20/ePDG/b_20-ePDG-Admin/b_20-ePDG-Admin_chapter_01.pdf.
"HeNB (LTE Femto) Network Architecture," The Femto Forum, May 2011, retrieved from http://www.3g4g.co.uk/SmallCells/Femtocells_WP_Architecture_1105_FemtoForum_pdf.

"GTP-based S2b Interface Support on the P-GW and SAEGW," SAE-GW Administration Guide, Star OS Release 20, pp. 1-50, retrieved from https://www.cisco.com/c/en/us/td/docs/wireless/asr_5000/20/SAEGW/b_20_SAEGW_Admin/b_19_SAEGW_Admin_chapter_01000.pdf.
"IPSec Basics," pp. 1-9, retrieved on Sep. 1, 2017, retrieved from http://www.amaranten.com/support/user%20guide/VPN/IPSec_Basics/Overview.htm#ESP_Encapsulating_Security_Payload_.
Sandvine Intelligent Broadband Networks, "Quality of Service in LTE," Sandvine Incorporated ULC., Sep. 21, 2014.
Mikio Iwamura, Hideaki Takahashi, and Satoshi Nagata, "Relay Technology in LTE-Advanced," NTT DOCOMO Technical Journal, vol. 12, No. 2, pp. 29-36.
Nichols, K, Blake, S., Baker, F., Black, D., "Definition of the Differentiated Services Field (DS Field) in the IPv4 and IPv6 Headers," Network Working Group, RFC 2474, Dec. 1998, retrieved from https://tools.ietf.org/pdf/rfc2474.pdf.
Fenner, B., "Experimental Values in IPv4, IPv6, ICMPv4, ICMPv6, UDP, and TCP Headers," Network Working Group, RFC 4727, Nov. 2006, retrieved from https://tools.ietf.org/pdf/rfc4727.pdf.
Information Sciences Institute, University of Southern California, Internet Protocol Darpa Internet Program Protocol Specification, Sep. 1981, pp. 1-45, retrieved from https://toolsietforg/html/rfc791.
"UE Relay for Public Safety," HTC, 3rd Generation Partnership Project, SA WG2 Meeting S2 #98, Jul. 9, 2013, retrieved from http://www.3gpp.org/ftp/tsg_sa/WG2_Arch/TSGS2_98_Valencia/Docs/.
PCT International Search Report for PCT/US17/40528 dated Sep. 22, 2017.

* cited by examiner

INTELLIGENT RAN FLOW MANAGEMENT AND DISTRIBUTED POLICY ENFORCEMENT

CROSS-REFERENCE TO RELATED APPLICATIONS

This application is a non-provisional conversion of, and claims priority under 35 U.S.C. § 119(e) to, U.S. Provisional Pat. App. No. 62/356,781, "Intelligent RAN Flow Management and Distributed Policy Enforcement," filed Jun. 30, 2016, which is hereby incorporated herein in its entirety for all purposes. This application also hereby incorporates by reference for all purposes the following documents: US20150092688; US20140192643; WO2013145592A1; US20140086120; US20140092765; US20140133456; US20140233412; US20150009822; US20150045063; US20150078167; US20150173111; US20150257051; US2016008182.

BACKGROUND

End users and businesses are demanding more from the telecommunication industry. While end users request personalized services, better performance, better user experience, businesses need to get more information about their consumers, easier and more secure access to devices and greater flexibility for provisioning new services. There is a key role to play for equipment providers, service providers and IT players together to make this a reality by providing converged IT and network infrastructure.

The continuing growth of mobile traffic is well documented, driven mainly by consumer smart phones, streaming video, messaging and P2P applications. The growth in mobile traffic is set to increase dramatically as enterprises extend their business processes to smart mobile devices and as machine-to-machine solutions mature throughout vertical industries. Wireless sensors are key enablers to many mission-critical scenarios, from smarter traffic to video analytics. Wireless sensors are expected to grow in their numbers exponentially over the next 10 years. The cellular network is the ubiquitous platform for integrating these devices with vertical back office solutions.

The worlds of IT and telecommunications networking are converging bringing with them new possibilities and capabilities that can be deployed into the network. A key transformation has been the ability to run IT based servers at network edge, applying the concepts of cloud computing (Mobile-Edge Computing or MEC). Mobile-Edge Computing can be seen as a cloud server running at the edge of a mobile network and performing specific tasks that could not be achieved with traditional network infrastructure. Machine-to-Machine (M2M) gateway and control functions and content caching are two examples, but there are many others.

However, many traffic flows need low latency. All real-time media require a certain level of latency, particularly at the edge of the network. Introducing any new network element to perform edge processing also typically introduces new latency.

SUMMARY

A system is disclosed for providing configurable flow management, comprising: a first base station coupled to a user device and with an established control connection with the user device; and a coordinating node coupled to the first base station and coupled to a core network, thereby providing a gateway for the first base station and the user device to the core network, the core network further comprising a policy and charging rules function (PCRF) node with a database of policy rules, wherein the coordinating node is configured to retrieve policy rules from the PCRF node, to enable enforcement of retrieved policy rules on flows from the user device passing through the coordinating node, and to transmit policy rules to the first base station for enforcement at the first base station.

The first base station may be capable of at least one of a 2G air interface, a 3G air interface, or a 4G air interface. The PCRF node may be located at a 4G long term evolution (LTE) packet data network gateway (P-GW). Enforcement may be performed at the first base station and the first base station may receive policy rules via the coordinating node. Enforcement may be performed at the first base station and the policy rules may include one or more of: sending machine-to-machine (M2M) traffic to a M2M server; sending traffic destined for a particular URL or IP or IP network to an IP offload server. Enforcement may be performed at a second base station coupled to the first base station via a mesh network, and the second base station may be configured to receive an enforcement rule via the coordinating node. Enforcement of a flow originated via a second base station may be performed at the first base station, the second base station coupled to the first base station via a mesh network. Enforcement may be performed at the coordinating node.

The coordinating node may be further configured to perform deep packet inspection. The coordinating node may be further configured to enable matching of the retrieved policy rules for a flow using one or more of source address, source port, destination address, destination port, destination uniform resource locator, and protocol. The coordinating node may be further configured to enable enforcement of the retrieved policy rules for a flow using source address, source port, destination address, destination port, uniform resource locator (URL), access point name (APN), and protocol. The coordinating node may be further configured to enable enforcement of the retrieved policy rules using an access point name. The coordinating node may be further configured to enable enforcement of the retrieved policy rules to cause redirection of a packet flow from the first base station via local IP access (LIPA) or selected IP traffic offload (SIPTO) or a gateway to the public Internet. The coordinating node may be further configured to enable enforcement of the retrieved policy rules to cause redirection of a packet flow from the first base station to a mobile edge computing node or to a media caching node.

The retrieved policy rules may be static rules, dynamic rules, pattern-matching rules, or heuristic rules.

The system may comprise a PCRF proxy at the coordinating node for caching and delivering policy rules. The system may comprise enforcing a policy rule to change one or more of: modulation; scheduling; and transmit power at the first base station. The system may comprise reducing latency for performing policy enforcement by enforcing policy rules at the first base station.

In another embodiment, a system is disclosed for providing configurable flow management, comprising: a first base station in radio frequency proximity to a user device and with an established control connection with the user device, the first base station further comprising a policy control and charging enforcement function (PCEF) with a database of policy rules, wherein the PCEF is configured to retrieve policy rules from a coordinating node acting as a gateway to a core network, the coordinating node further configured to retrieve policy rules from a policy charging and rules function (PCRF) in the core network, to enable enforcement of retrieved policy rules on flows from the user device passing through the first base station.

DETAILED DESCRIPTION

Overview

Figure 1:
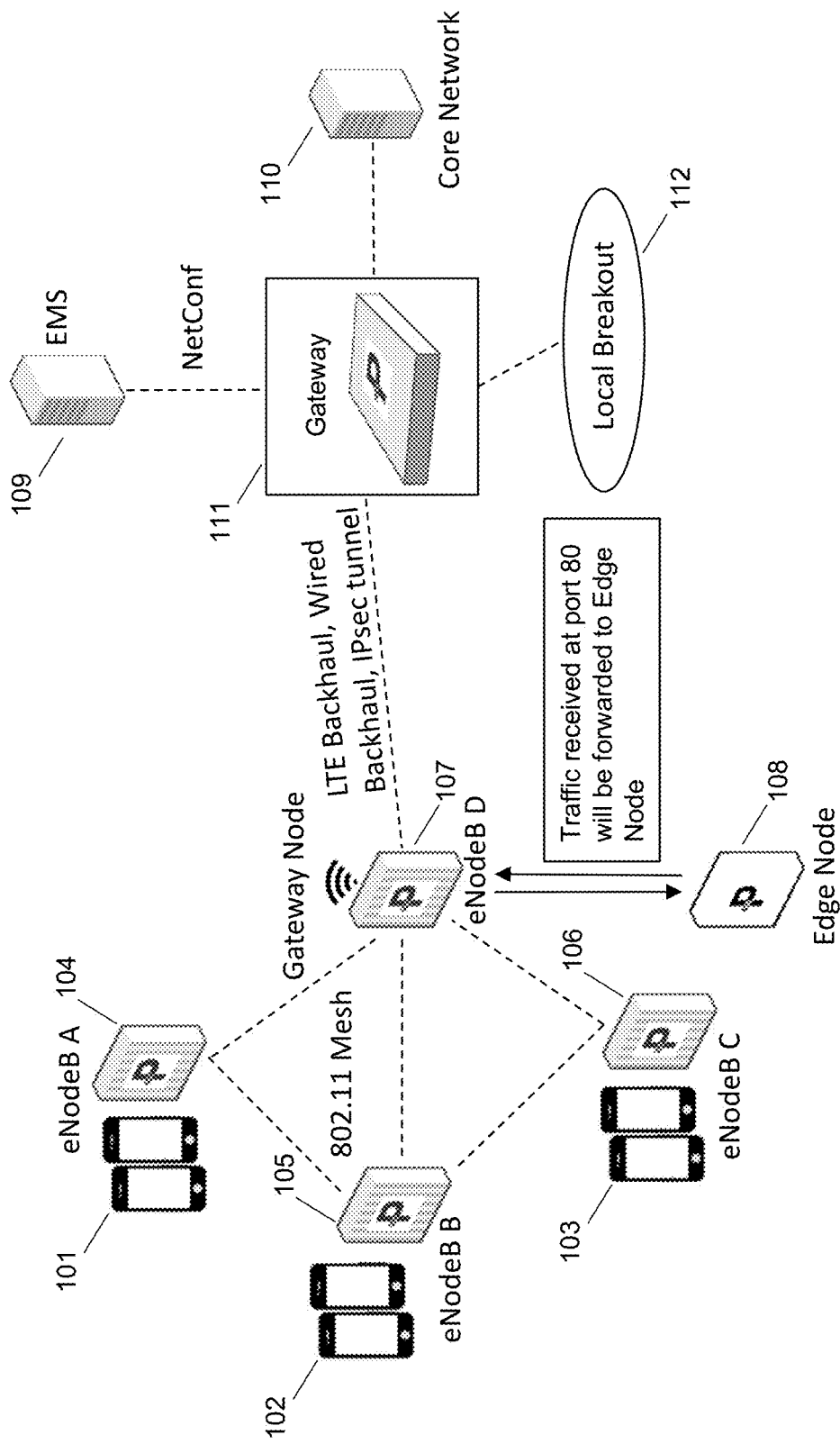
FIG. 1 is a schematic diagram of a first edge policy enforcement scenario, in accordance with some embodiments.

To enable the mobile edge computing scenarios efficiently and without causing additional latency issues, the eNodeB/NodeB needs to provide intelligent flow management. It needs to enable/disable the mobile edge computing scenarios per flow (UE/bearer) basis. These scenarios could be content caching, analytics, M2M applications, traffic offloading, security applications etc.

In some embodiments, each application server or edge computing node gets only flows that matter to that node. Flows may be identified using policies, shallow packet inspection (SPI), deep packet inspection (DPI), or other means. Policy rules may then be applied at the edge node. If no rule is in place at the edge rule, no action is taken, in some embodiments. In some embodiments, policy rule enforcement may be performed at any edge node. In a preferred embodiment, policy rule enforcement may be performed at a single centralized edge node such as at a mesh gateway, which simplifies interconnectivity between nodes (including security tunnel termination or IPsec issues). Rules may be put in place per bearer or per flow. This differs from the traditional rule enforcement role of the P-GW in the LTE EPC.

In some embodiments, flexible configurable policies may be provided that would be applied per flow (UE/bearer). Once the S1-U (data) packet is received from the UE, the policies would be applied and action would be taken on this packet. Depending on the action, the packet would be sent to the Mobile edge computing platform (could be single or different platform for each scenario/application). We could be using the shallow packet or deep packet inspection to apply the configurable policies.

One desired effect of the present disclosure is to push aspects of the Gx interface to the LTE RAN. Gx is the standard interface between the PCRF and policy coordination and enforcement function (PCEF). 3GPP TS 29.212 is hereby incorporated by reference in its entirety, and any and all of the functions described therein are envisioned as being able to be performed at the edge by the enhanced gateway or enhanced eNodeB, as described herein.

Information regarding a packet flow can be derived from the 5-tuple of: source address, source port, destination address, destination port, and protocol. Additionally, in some cases a URL may be used, derived from, e.g., packet inspection. Additionally, a 3GPP access point name (APN) may be used as information. This information can be used in combination to determine what kind of packet flow it is and what policy or policies should be applied to it. Distributed policy enforcement can thereby be provided using the information. In some embodiments, other characteristics of packet flows as described in 3GPP TS 29.212, hereby incorporated by reference in its entirety, may also be used to identify the packet flow.

Deep packet inspection (DPI) and other policy filtering functions can be performed at a gateway, such as at the Parallel Wireless HetNet Gateway™, that sits between a RAN and a core network. Other gateway nodes can also be used, such as a mesh node providing gateway access to a core network or a node that is providing backhaul to other nodes. Flows could also be inspected and filtered at an enhanced base station. The further up in the network these methods are performed, the more flows can be inspected; a single RAN eNodeB can only inspect and assign policies to its own flows. Higher up in the network, the caching, inspection and policy processing burden can be accommodated by a gateway having greater processing and electrical power, making this type of centralization helpful. Conversely, by pushing policies to the RAN edge, a decentralized system can provide enhanced performance characteristics and may be desirable in some cases.

Configuration could be shared across nodes in the mesh, in some embodiments; in some embodiments a single configuration could be sent from a central gateway or server to multiple mesh nodes, or in some embodiments coordination (such as configuration or negotiation) between one or more mesh nodes, or between mesh nodes and one or more central nodes, could be performed to determine which node should handle application of a flow filtering function or other function as described herein.

Static rules could be configured on the gateway node described herein, and could be remotely administered through a coordination server. Dynamic rules, pattern-matching or heuristic rules, or other types of rules could also be used. In some cases, PCRF involvement (or any communications to the core network) may not be required at all (e.g., policies not connected to PCRF policies). In some cases, PCRF involvement may be minimal, e.g., by providing a PCRF cache and proxy, which will also not require any additional modifications or communications to or from the core network. In some cases, the coordination server or other node described herein could act as a PCEF and/or appear as a PCEF when interacting with the PCRF. A static subset of the rules may be cached. A PCRF may also be designed to interoperate with a network edge computing policy enforcement gateway, namely, the gateway described herein, for coordinating policies and rules and for providing timely updates to caches. Rules could be 3GPP ADC rules, PCC rules, or other rules.

Traditional PCRF

The PCRF (Policy Control and Charging Rules Function) is a functional element (a software component) that encompasses policy control decision and flow based charging control functionalities. The PCRF provides network control regarding the service data flow detection, gating, QoS and flow based charging (except credit management) towards the PCEF. The PCRF reveives session and media related information from the Application Function (AF) and informs AF of traffic plane events. The PCRF accesses subscriber databases, charging databases, and other specialized functions in the operator core network.

The PCRF may provision PCC rules to the PCEF via the Gx interface. The Gx reference point is used for provisioning and removal of Policy and Charging Control (PCC) rules from the PCRF to the PCEF and the transmission of traffic plane events from the PCEF to the PCRF. The Gx reference point can be used for charging control, policy control or both by applying policies relevant to the application.

The PCRF PCC rule decisions may be based on one or more of the following:

Information obtained from the Application Function (AF) via Rx interface, e.g. session, media and subscriber related information Information obtained from the PCEF via the Gx interface, e.g. IP CAN bearer attributes, request type and subscriber related information Information obtained from the SPR via the Sp interface, e.g. subscriber and service related data Information Obtained from the BBERF Via the Gxx Interface Own PCRF pre-configured information. If the information from the PCEF (Policy and Charging Enforcement Function) contains traffic mapping information not matching any service data flow filter known to the PCRF, and PCRF allows the UE to request enhanced QoS fo services not known to the PCRF. The PCRF may add this traffic mapping information as service data flow filters to the corresponding authorized PCC rule. The PCRF may wildcard missing filter parameters.

The PCRF may report events to the AF via Rx interface. The PCRF may inform the PCEF through the use of PCC rules on the treatment of each service data flow that is under PCC control, in accordance with the PCRF policy decisions. PCRF may be able to select the bearer control mode that will apply for the IP CAN session and provide it to the PCEF via the Gx interface.

Upon subscription to loss of AF (Application Function) signalling bearer notifications by the AF, the PCRF may request the PCEF to notify the PCRF of the los of resources associated to the PCC rules corresponding with AF Signaling IP Flows, it this has not been requestet previously.

Traditional PCEF

The PCEF (Policy and Charging Enforcement Function) is the functional element that encompasses policy enforcement and follow based charging functionalities. This functional entity is traditionally located at the Gateway (PGW). It provides control over the user plane traffic handling at the Gateway and its QoS, and provides service data dlow detection and counting as well as online and offline charging interactions.

For a service data flow that is under policy control the PCEF may allow the service data flow to pass through the Gateway if and only if the corresponding gate is open. For a service data flow that is under charging control the PCEF may allow the service data flow to pass through the Gateway if and only if there is a corresponding a active PCC rule and, for online charging, the OCS has authorized the applicable credit with that Charging Key (Rule Base). The PCEF may let a service data flow pass through the Gateway during the course of the credit re-authorization procedure.

If requested by the PCRF, the PCEF may report to the PCRF when the status of the related service data flow changes. This procedure can be used to monitor an IP CAN bearer dedicated for AF signalling traffic.

Rule Enforcement Generally

In some embodiments, traffic flows may EPC bearers or 3G PDP contexts, carrying data from a mobile UE for a core network. However, traffic flows as described herein may also include generic IP flows, in which case individual flows may be identified at the Layer 1, Layer 2, or Layer 3 level using packet envelope information.

Prior to receiving a flow, rules are received at an enforcement node (which may be a base station or a coordinating node/gateway) from a PCRF node. Each flow is matched against all rules, according to a defined order of precedence, as with existing PCEF functions. In some embodiments, once the beginning of a flow is matched, caching rules may allow accelerated matching of packets that are received after the first match.

Rules may be dynamic or predefined. Dynamic policy and charging control (PCC) rules are dynamically provisioned by the PCRF to the PCEF via the Gx interface. These PCC rules may be either predefined or dynamically generated in the PCRF. Dynamic PCC rules can be Installed, Modified and Removed any time. Predefined PCC rules are preconfigured in the enforcement nodes. Predefined PCC rules can be Activated or Deactivated by the PCRF at any time. Predefined PCC rules within the PCEF may be grouped, allowing the PCRF to dynamically activate sets of PCC rules over the Gx interface. Heuristic rules may be used requiring processing to be performed at the node, e.g., obtaining information that is available on the flow, and performing a computation thereon.

Rules may include charging instructions or rules. 3GPP TS 23.203 and TS 23.401, hereby incorporated by reference in their entirety, describe the general policy and charging control architecture, and includes rules that provide flow-based charging, including charging control and online charging control, as well as policy control, e.g., gating control, QoS control and signaling.

Each rule may have one or more of: a rule name; a service identifier, identifying the relevant service or service component; service data flow filter(s) for selecting applicable traffic flows, including wildcards; an application identifier; a flow direction, e.g., inbound/outbound, uplink/downlink; a precedence; a gate status (i.e., whether this flow should be treated as enabled/open or disabled/closed); QoS parameters, such as QoS class identifier (QCI), allocation and retention priority (ARP), max/min guaranteed bitrate, max/min guaranteed latency; an indication for packet switched to circuit switched (PS to CS) session continuity; a charging key (i.e. rating group); other charging parameters; a monitoring key; a sponsor identity; an application service provider identity; an indication of access network information reporting; and a redirect. A charging key defines whether online and offline charging interfaces are used, what is to be metered in offline, on what level the enforcement function can report the usage related to the rule, etc. A monitoring key identifies a monitoring control instance that can be used for usage monitoring control of the service data flows controlled by the predefined PCC rule or dynamic PCC rule. The service data flow filters may typically include one or more of: a source or destination IP; a source or destination port; a URL; an APN; and a protocol. The rules may be extended to include other parameters as described elsewhere herein.

Examples of policies could be, in some embodiments: Any traffic coming for destination port of 80 shall be sent to cache server; Any traffic coming for destination port 80, have a particular URL (Verizon.com) shall be offloaded to the application server hosted by Verizon; On receiving the location information from the UE, pass the information towards Location/analytics server for location based services; Any M2M traffic coming on a particular port/URL (proprietary or M2M standard defined) shall be forwarded to the M2M server; Any ZigBee traffic shall be forwarded to a particular M2M server.

In some embodiments, shallow or deep packet inspection may also be performed on a flow for matching a rule. As encapsulation into an encrypted tunnel is performed either at the base station or at the coordinating node, unencrypted traffic may be available for inspection at these nodes in addition to at the PGW.

Application of charging rules may include monitoring of a flow. For example, a particular user may be permitted to use a certain number of bytes of data at a normal QoS level. The enforcement function for such a rule requires tracking of the number of bytes and subsequently reducing the QoS level of the flow once the threshold number of bytes is exceeded. Such tracking may be performed, in certain embodiments, at the base station or coordinating node being used to apply rules, as described herein. The rules enforcement tracking may be performed at a per-flow basis, a per-UE basis, or another basis. Each base station may perform enforcement tracking for its own flows and UEs. Upon handover or mobile device mobility, each base station may coordinate with the coordinating node and/or with the target base station to ensure that no gap in tracking is caused, in some embodiments.

The coordinating node may support providing this functionality for multiple APNs, multiple core networks, etc. depending on the configuration and its position in the network.

In some embodiments, each enforcement function/node may communicate with the core network charging architecture, e.g., CDF, CGF, and other charging functions as described in 3GPP TS 32.240, hereby included in its entirety for all purposes, e.g., over the Gy and Gz reference points. In some embodiments, charging communications may instead be forwarded up to the coordinating node for performing Gy and Gz and other charging signaling, or in some embodiments such communications may be forwarded further up to a proxy PCEF function in the core network to perform direct communication with the core network charging functions.

Advantages of this distributed enforcement model include reduction in latency, as policy enforcement is performed closer to the user; greater accuracy between user device and core network charging metrics, because data is not sent over the network only to be rejected at the core network; and a reduction in the needed processing capacity of the PGW, which no longer needs to perform as much processing as it is no longer responsible for all policy enforcement for every packet flow passing through the network (even for packet flows not passing through the PGW to another network).

Applications of this model of enforcement include: sensor networks and M2M networks, including Zigbee networks; multimedia caching; multimedia calling; and other mobile edge computing-centric applications. For example, M2M traffic could be offloaded to a separate M2M server without putting an increased processing burden on the PGW, or a rule could send unencrypted HTTP traffic to a content caching node to save bandwidth for successive queries for the same content.

Characteristics of Flows

As used herein, a flow may be an EPS bearer in LTE, or a PDP context in 3G. A flow may be an IP session between two nodes, as determined by matching source/destination IP address and port, and as also determined by identical protocols and optionally a time window. Any characteristic of a flow may be matched by the policy rules described herein. IPv4 and IPv6 may be supported. See 23401-f00, which is hereby incorporated herein in its entirety for all purposes.

Rule Propagation

In some embodiments, a coordinating node, the coordinating node being located within the RAN or between a RAN and a core network, may be used to request and obtain policy rules from a PCRF in the core network. Rules may be requested using the Gx interface of the PCRF, via the Diameter protocol or a Diameter-based protocol. The rules may be cached at the coordinating node. The rules cache may be kept up to date by using a last updated timestamp for each rule or for the time the cache is brought up to date, in some embodiments, or by using a time-to-live (TTL) retention policy for individual rules, or using another well-known method, so that the PCRF is able to send new rules to the coordinating node.

In some embodiments, the coordinating node may then subsequently be used to propagate the rules to a plurality of nodes, including, in some embodiments, in a mesh network. The coordinating node may obtain and track information about which rules are located at each node, perform caching of rules, and request and cause propagation of rules to nodes, including sending rules to nodes that are not up to date. Two-way communication with the RAN nodes may be performed to facilitate this, which in some embodiments may be via an S1 interface, an X2 interface, or another proprietary interface or protocol.

In some embodiments, the coordinating node may act as a PCRF to other nodes in the network, or may have a co-located PCRF in the case that a coordinating node is also co-located with a local, or embedded, EPC. In some embodiments, a PCRF in the core network may be placed behind a PCRF proxy, and the PCRF proxy may alert the coordinating node when the cached rules should be updated; using a proxy is desirable in that existing PCRFs do not need to be updated to handle additional queries.

In some embodiments, installation/modification/removal of rules at a particular enforcement node may be permitted by said enforcement node. In some embodiments, activation/deactivation of rules may be permitted by each enforcement rule.

In some embodiments, standard PCRF-PCEF provisioning procedures over the Gx interface may be followed by the coordinating node or PCRF proxy when retrieving rules from the PCRF (PULL provisioning, Credit Control Request/Answer Update_Request, PUSH unsolicited provisioning, re-auth request (RAR)/re-auth answer (RAA) messaging, event-trigger messaging, etc. as defined further in 3GPP TS 29.212, hereby incorporated herein in its entirety. In some embodiments, the same procedures/messages may be used between the coordinating node and individual base stations or enforcements, over Gx or Diameter, or over X2, or over another protocol or interface, or these procedures/messages may be extended to include additional functionality as described herein.

In some embodiments, the coordinating node may create new rules and may propagate them to nodes throughout the network. In some embodiments, new rules cannot be propagated back up to the core network PCRF but can be propagated to the coordinating node, base stations, or other nodes in the network.

Selection of an Enforcement Point

In some embodiments, multiple network nodes may be suitable for providing policy enforcement, based on a given network configuration or characteristics of a particular flow.

For example, a network capable of providing RAN-based policy enforcement may still be able to provide traditional PCEF-based enforcement at the PGW in the EPC. In such instances, the coordinating node may act to coordinate the behavior of any connected RAN nodes, to turn RAN-based policy enforcement on or off for specified flows or time periods or user devices. This can be performed to avoid duplicate enforcement. The coordinating node may coordinate the same with the PGW and PCEF, in some instances, or may hide this level of coordination and enforcement from the PGW/PCEF, in other instances. In some embodiments, certain rules may be enforced at the RAN while other rules may be enforced at the core. For example, redirection rules that cause IP offload at the base station need not be enforced at the core. This is desirable for scenarios using LIPA, SIPTO, etc. and also solves problems concerning enforcement of charging policies for Internet-backhauled traffic.

In some embodiments, a SIPTO or LIPA offload architecture may have a local gateway node that is a logical place in the network to provide policy enforcement; an enforcement node can be added in that location. In some embodiments, SIPTO and LIPA may be able to be provided even for APN-based services if a flow matches a particular filter, e.g., when a subscriber accesses YouTube, the subscriber may still access the IP offload functionality using the subscriber's APN.

In some embodiments, enforcement may be performed preferentially at an anchor point or gateway node for a flow. This provides a natural way to assign an enforcement node. For example, certain flows are anchored at the PGW itself. Enforcement of policies may be performed at the PGW for these flows. However, for other flows, not anchored at the PGW due to being offloaded to the Internet instead of being directed toward the PGW, enforcement may be performed at a network node under the control of the network operator before the flow exits the operator network into the public Internet.

Mesh Network

In some embodiments, a coordinating node, the coordinating node being located within the RAN or between a RAN and a core network, may be used to propagate the rules to a plurality of nodes, including, in some embodiments, in a mesh network.

Coordination may require the mesh nodes to communicate directly or via a coordinating node. Coordination may involve the use of a coordination node to perform centralized coordination. Coordination may be performed using an extensible X2 interface/protocol.

For deploying a mesh network for providing telecommunications access, one of the limiting factors is the availability of backhaul to connect to the outside world via the Internet or an operator network. The mesh nodes could coordinate with each other and/or a centralized node to communicate what backhaul connections are available at other nodes in the network, which is further described in U.S. Pat. Pub. No. US20140233412, hereby incorporated by reference in its entirety. A coordinating node may use information about backhaul availability when performing policy rule enforcement, for example by sending a low-latency, low-bandwidth flow to a low-latency, low-bandwidth backhaul link and by sending a high-latency, high-bandwidth flow to a default backhaul link.

Coordination in the mesh network may also include sharing policy and enforcement rules among nodes, performing cache coherency checking, querying other nodes about current utilization of bandwidth and network/node resources, etc. in order to enable computation, identification, and enforcement of appropriate policy rules for a particular flow.

Ad-Hoc Network

In embodiments pertaining to an ad-hoc network, rules may be propagated from a local limited core network (or local/embedded EPC, or any-G core network) in communication with the local ad-hoc network, e.g., a local limited core network physically co-located with one of the nodes of the ad-hoc network. A coordinating function (HNG) may be co-located with the local limited core network. The local limited core network provides a local cache of certain information, such as HSS and AAA information, and performs authentication functions to enable eNodeBs to permit UEs to attach to the network. Such a local limited core network may be useful to provide limited connectivity when, for example, a backhaul connection is not available. Further information about such a local limited core network is as described in U.S. Pat. Pub. No. US20140233412, hereby incorporated by reference in its entirety. The local limited core network may provide a PCRF function and may use this function to provide rules to the network, as described throughout this application. The local limited core network may provide a PGW function and may provide PCEF functionality embedded therein, in addition to or in place of the policy enforcement functionality described herein. The local limited core network PGW function may provide IP routing to the Internet. The local limited core network may perform management of rules for other nodes in the network, as described herein with reference to a coordinating node.

In the special case of an ad-hoc network not connected to an active backhaul connection (e.g., to the Internet or an operator core network), the policy enforcement functionality described herein may be used to permit free, non-billed calls or sessions among users on the same ad-hoc network.

Network Slicing

In some embodiments, enhancements may be made that deliver end-to-end quality of service (E2E QoS) capability and further improvements thereto. Theis type of improvement is often referred to as "network slicing," as the end-to-end nature of such functionality enables each flow to be considered as its own slice of the network. Policy enforcement as described herein may provide network slicing via enabling enforcement of policies at every network layer, including from the base station/RAN, a transport layer or backhaul transport, a coordinating node or gateway layer. End-to-end policy enforcement could be applied to an entire EPS bearer, for example, ARP/QCI assignment.

Network slicing may be enabled as follows. For example, to enable a network slice for a machine to machine (M2M) network node attached to a base station, the network may determine, based on characteristics of a data flow received from the M2M node, at any particular node in the system, that the node requires a low-latency, low-bandwidth link. The coordinating node or the base station may then perform policy enforcement according to the appropriate policy for a low-latency, low-bandwidth link (providing lower latency than would be possible were the policy enforcement to be performed after sending the traffic to the PGW).

Since a given network slice may be provided with a higher quality of service than another slice, in some instances, it is desirable to enforce different charging rules for different network slices. This is enabled by the enforcement system described herein, including for low-latency links that avoid sending flow data back to the core network PGW, by performing enforcement at the RAN or at the RAN-adjacent coordinating node. For example, bytes delivered via a particular network slice may be tracked using a policy rule, and once a number of bytes delivered exceeds a threshold it may trigger an additional charge to be recorded, or the flow may be immediately terminated. As another example, individual flows may be evaluated based on packet inspection, so that low-bandwidth or high-latency flows from a UE may be given favorable charging rates according to one policy, while high-bandwith, low latency flows may be charged more according to another policy. Enforcement at the RAN edge has the beneficial effect of reducing lag time between the time a threshold is exceeded and when the flow is cut off.

5G Latency Improvements

In certain embodiments, latency may be improved by performing enforcement at the RAN or edge of the network. This may contribute to the desired ultra-low latency role envisioned for the forthcoming 5G network architecture. In the prior art, policy enforcement occurs at the core network, specifically, at a PGW, and enforcement at the PGW consequently requires that traffic must travel through the network and core to the PGW before any policy rule is applied. By eliminating this trip to the core, latency can be improved, potentially reducing policy enforcement-caused latency to a short processing period at the RAN node (no additional transportation latency is required if the base station is already receiving the traffic for transport of the flow). Additionally, enforcement at the RAN enables policy enforcement even in cases where traffic is diverted from the core network, e.g., in LIPA or SIPTO or other IP-offload scenarios.

In some embodiments, low latency can be improved by identifying particular flows that require low latency and providing them with increased bandwidth or priority QoS or QCI, or by selecting dedicated bearers for such flows. In some embodiments, low latency can be improved by enforcing appropriate policies on other flows within the network, either at the same base station or elsewhere in the network, such as elsewhere in a mesh network sharing a limited backhaul connection. In some embodiments, low latency can be improved by selecting an appropriate backhaul connection for the low-latency flows, for example, a low-latency or high-bandwidth backhaul connection, or by selecting other backhaul for other traffic and thereby reserving a low-latency or high-bandwidth backhaul connection for the low-latency flow.

RAN-Based Policies

In some embodiments, when enforcement is moved to the radio access network, different policy enforcement tools become available. For example, as well as the typical QCI configuration changes for particular flows, changes in modulation, scheduling, resource block allocation, power adjustment, and other physical interface parameters may be adjusted based on policy enforcement at the RAN. Typically, these types of RAN optimizations are not performed on specific flows based on policy rules because of the absence of a mechanism to send policy rules down to individual RAN nodes. Moving policy enforcement to the RAN enables these policies to be performed on a per-flow basis.

In some embodiments, explicit congestion notification (ECN), DSCP marking, throttling, tagging, bandwidth limiting, etc. may be enabled using policy enforcement for 3GPP and for non-3GPP radio access technologies (RATs), such as regular IP and Wi-Fi access. In some embodiments, management of 3G PDP contexts and LTE bearers may be enabled using policy enforcement to mark particular flows with ARP and preemption, etc. characteristics.

Any-G, Any-RAT

Edge-based policy enforcement could be used in a converged wireless network including multiple radio access technologies (RATs), in some embodiments. In a network with multiple RATs, e.g., supporting one or more of 2G/3G/4G/5G, including potentially at the same time, the functionality described above as relating to an LTE network could be reused for data traffic originated at a base station compatible with another RAT, as long as the originating base station is able to interwork any data flows to LTE data flows or IP data flows.

Edge-based policy enforcement could also be used in a non-4G network, such as a 3G network; in a 3G network the PCEF function resides at the global GPRS support node (GGSN), instead of the EPC PGW, but the same principles described herein could be used to deply policy enforcement out to the edge of the network (e.g., to nodeBs) and/or to a radio network controller (RNC).

Different network slices could be provided for each RAT, using end-to-end policy enforcement, in some embodiments.

FIG. 1 is a schematic diagram of a first edge policy enforcement scenario, in accordance with some embodiments. In the diagram, UEs 101 are attached to eNodeB 104, UEs 102 are attached to eNodeB 105, and UEs 103 are attached to eNodeB 106. eNodeBs 104, 105, 106 are in communication using a Wi-Fi mesh network to gateway node 107, which itself is an eNodeB as well. Gateway node 107 has two backhaul connections (LTE and wired) to a gateway 111, which is a coordinating node as described herein. Gateway node 107 also has a secure IPsec tunnel with gateway 111. Gateway node 107 also has a connection with edge node 108, which is not a backhaul connection because it is not connected to the public Internet or a core network. Edge node 108 may be a content delivery network (CDN) server, media server, multimedia broadcast multicast services (MBMS) server, or the like, hosting content. The gateway 111 is connected to the public Internet (shown as Local Breakout 112), and to a core network 110, and to an element management system (EMS) 109 for managing the nodes in the network.

In operation, gateway 111 receives policies from a PCRF in the core network 110, and pushes these policies down to gateway node 107. Gateway node optionally pushes the policies throughout the mesh to eNodeBs 104, 105, 106. When certain traffic is received at any of eNodeBs 104, 105, 106, 107, policy rules can be matched and enforced via route tagging, DSCP tagging, or redirection. In the diagram, traffic received at port 80 is forwarded to edge node 108 instead of being sent over the backhaul link. Edge node 108 then serves the requested object back to the base station without requiring the traffic to be sent for policy enforcement at the core, and without requiring the core to serve the traffic.

Figure 2:
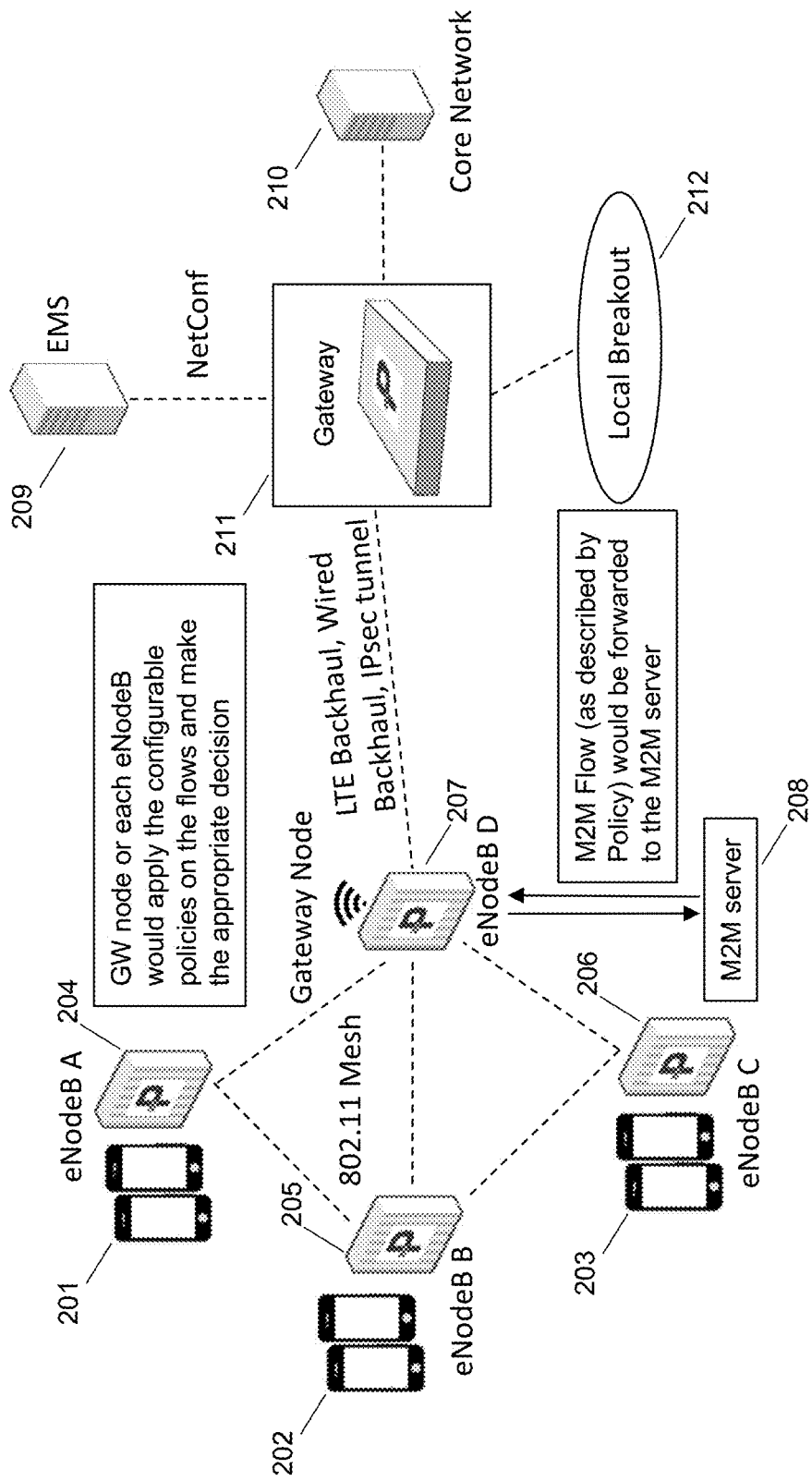
FIG. 2 is a schematic diagram of a second edge policy enforcement scenario, in accordance with some embodiments.

FIG. 2 is a schematic diagram of a second edge policy enforcement scenario, in accordance with some embodiments. In the diagram, UEs 201 are attached to eNodeB 204, UEs 202 are attached to eNodeB 205, and UEs 203 are attached to eNodeB 206. eNodeBs 204, 205, 206 are in communication using a Wi-Fi mesh network to gateway node 207, which itself is an eNodeB as well. Gateway node 207 has two backhaul connections (LTE and wired) to a gateway 211, which is a coordinating node as described herein. Gateway node 207 also has a secure IPsec tunnel with gateway 211. Gateway node 207 also has a connection with machine-to-machine (M2M) server 208, which is not a backhaul connection because it is not connected to the public Internet or a core network. The gateway 211 is connected to the public Internet (shown as Local Breakout 212), and to a core network 210, and to an element management system (EMS) 209 for managing the nodes in the network.

In operation, gateway 211 receives policies from a PCRF in the core network 210, and pushes these policies down to gateway node 207. Gateway node optionally pushes the policies throughout the mesh to eNodeBs 204, 205, 206. When certain traffic is received at any of eNodeBs 204, 205, 206, 207, gateway node 207 or each base station node would apply the configurable policies on the flows as appropriate. For example, as shown, a machine-to-machine (M2M) flow matching a policy would be forwarded to an M2M server 208. This is advantageous to the network, at least for the following reasons. M2M traffic can require low latency, and edge-based enforcement provides lower latency than requiring the traffic to go up to the core network for policy enforcement. M2M traffic may involve a large number of network end user devices, and the resource consumption at the core could be avoided by providing services at the M2M server directly. Also, the bandwidth required for the M2M traffic would not be required to be sent over the backhaul connection.

Figure 3:
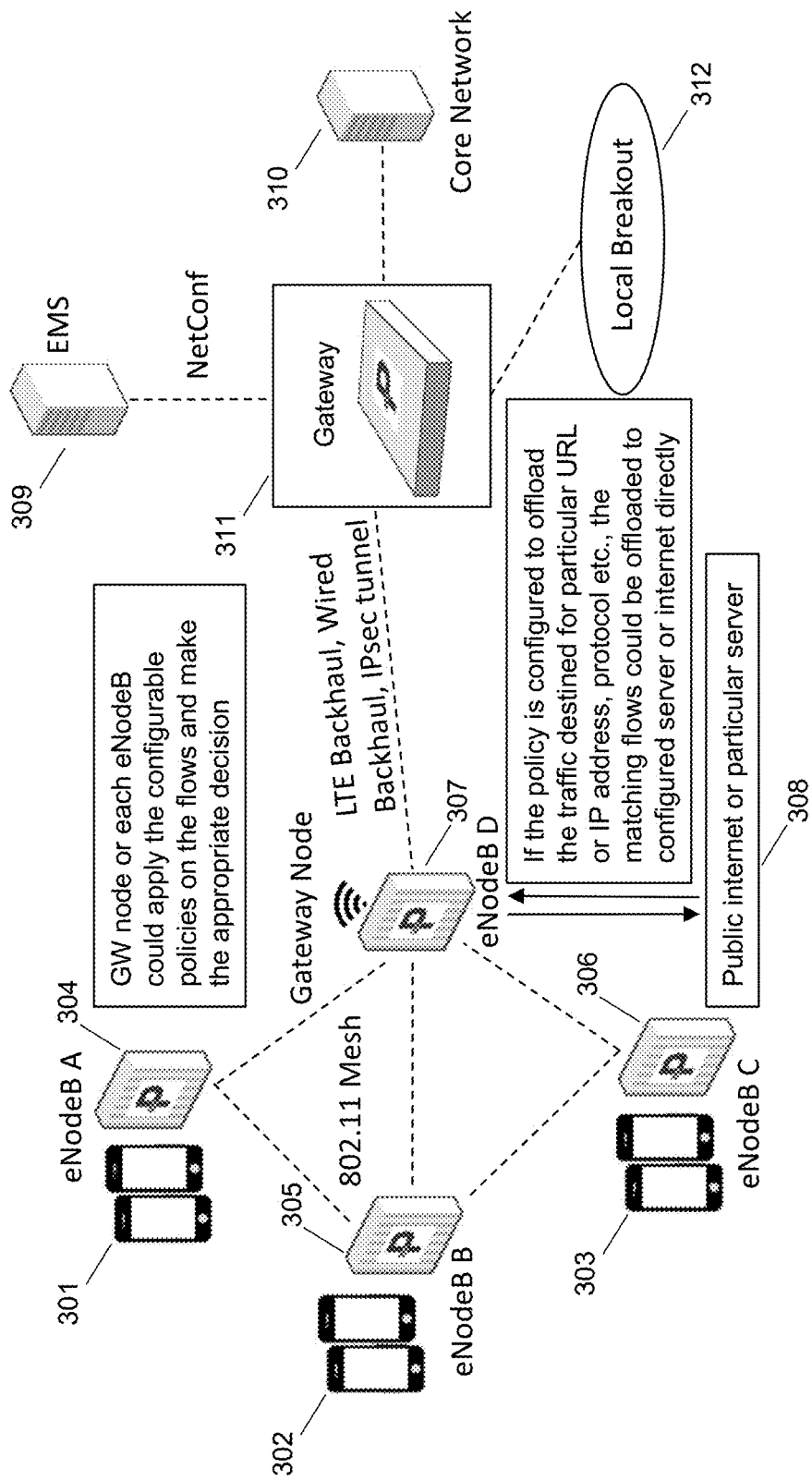
FIG. 3 is a schematic diagram of a third edge policy enforcement scenario, in accordance with some embodiments.

FIG. 3 is a schematic diagram of a third edge policy enforcement scenario, in accordance with some embodiments. In the diagram, UEs 301 are attached to eNodeB 304, UEs 302 are attached to eNodeB 305, and UEs 303 are attached to eNodeB 306. eNodeBs 304, 305, 306 are in communication using a Wi-Fi mesh network to gateway node 307, which itself is an eNodeB as well. Gateway node 307 has two backhaul connections (LTE and wired) to a gateway 311, which is a coordinating node as described herein. Gateway node 307 also has a secure IPsec tunnel with gateway 311. Gateway node 307 also has a connection with the public Internet or a particular server, shown as box 308. The gateway 311 is connected to the public Internet (shown as Local Breakout 312), and to a core network 310, and to an element management system (EMS) 309 for managing the nodes in the network.

In operation, gateway 311 receives policies from a PCRF in the core network 310, and pushes these policies down to gateway node 307. Gateway node optionally pushes the policies throughout the mesh to eNodeBs 304, 305, 306. When certain traffic is received at any of eNodeBs 304, 305, 306, 307, gateway node 307 or each base station node would apply the configurable policies on the flows as appropriate. For example, as shown, gateway node 307 or each eNodeB could apply the configurable policies on the flows and make an appropriate decision. If a policy is configured to offload traffic destined for a particular URL or IP address, protocol, etc., the matching flows could be offloaded to a configured server or the Internet directly, as shown as box 308.

Figure 4:
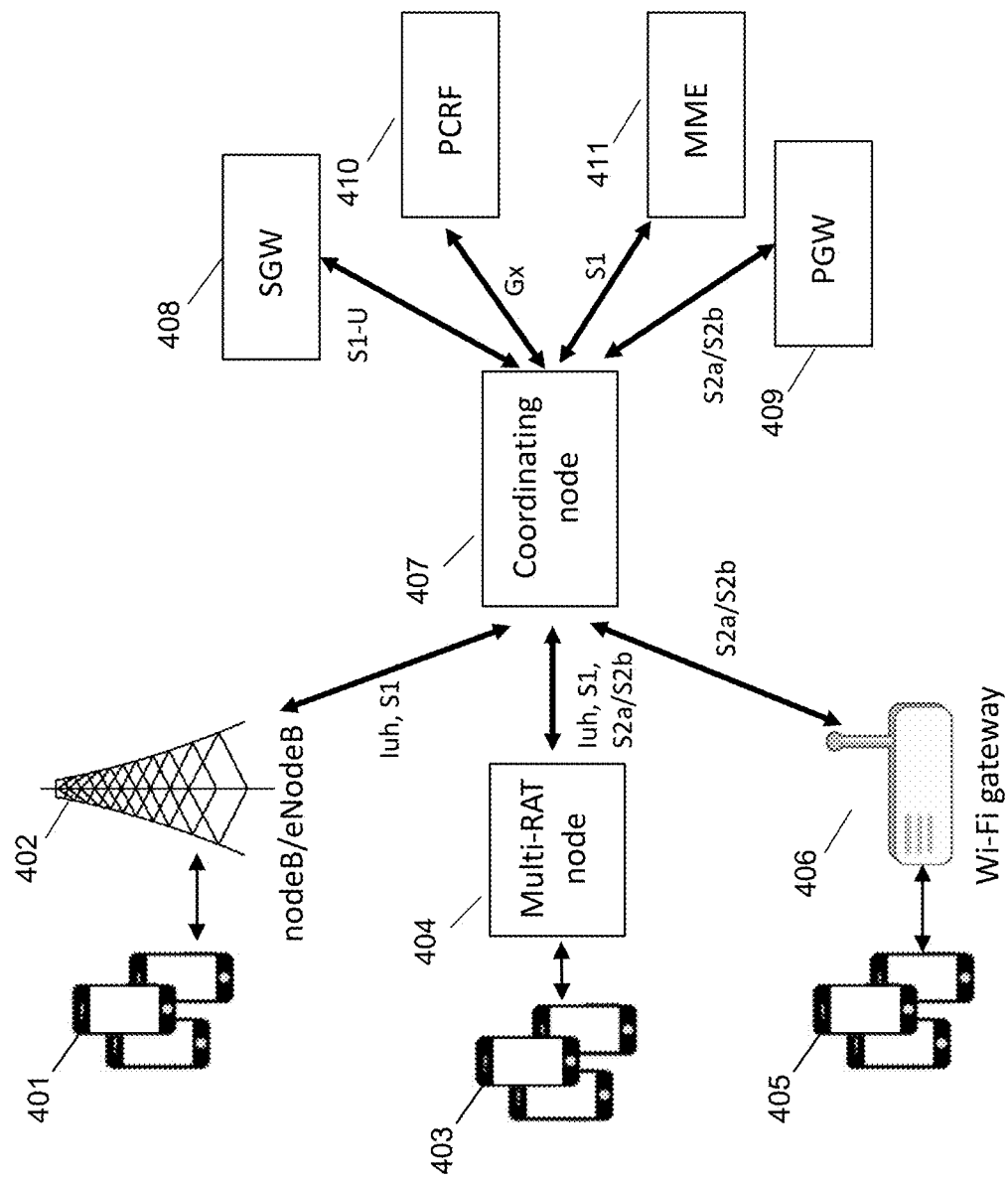
FIG. 4 is a schematic diagram of a network, in accordance with some embodiments.

FIG. 4 is a schematic diagram of a network, in accordance with some embodiments. UEs 401 are attached to 3G/4G nodeB/eNodeB 402, which may be capable of one or both RATs. UEs 403 are attached to multi-RAT node 404, which may be capable of two or more RATs. Mobile devices 405 are attached to Wi-Fi gateway 406. nodeB/eNodeb 402, multi-RAT node 404, and Wi-Fi gateway 406 each provide a radio access network (RAN) to their respective mobile devices. nodeB/eNodeb 402, multi-RAT node 404, and Wi-Fi gateway 406 also are coupled to a core network, consisting of a plurality of network nodes (SGW 408, PCRF 410, MME 411, PGW 409), via coordinating node 407. The 3G RAN is connected to the coordinating node via the Iuh interface, the 4G RAN is connected to the coordinating node via the S1 or S2 interface, and the Wi-Fi node is able to provide a secure connection to the coordinating node via the S2a/S2b interface. The coordinating node 407 plays a policy enforcement role as described herein. Each of RAN nodes 402, 404, and 406 may also provide policy enforcement as described herein.

Figure 5:
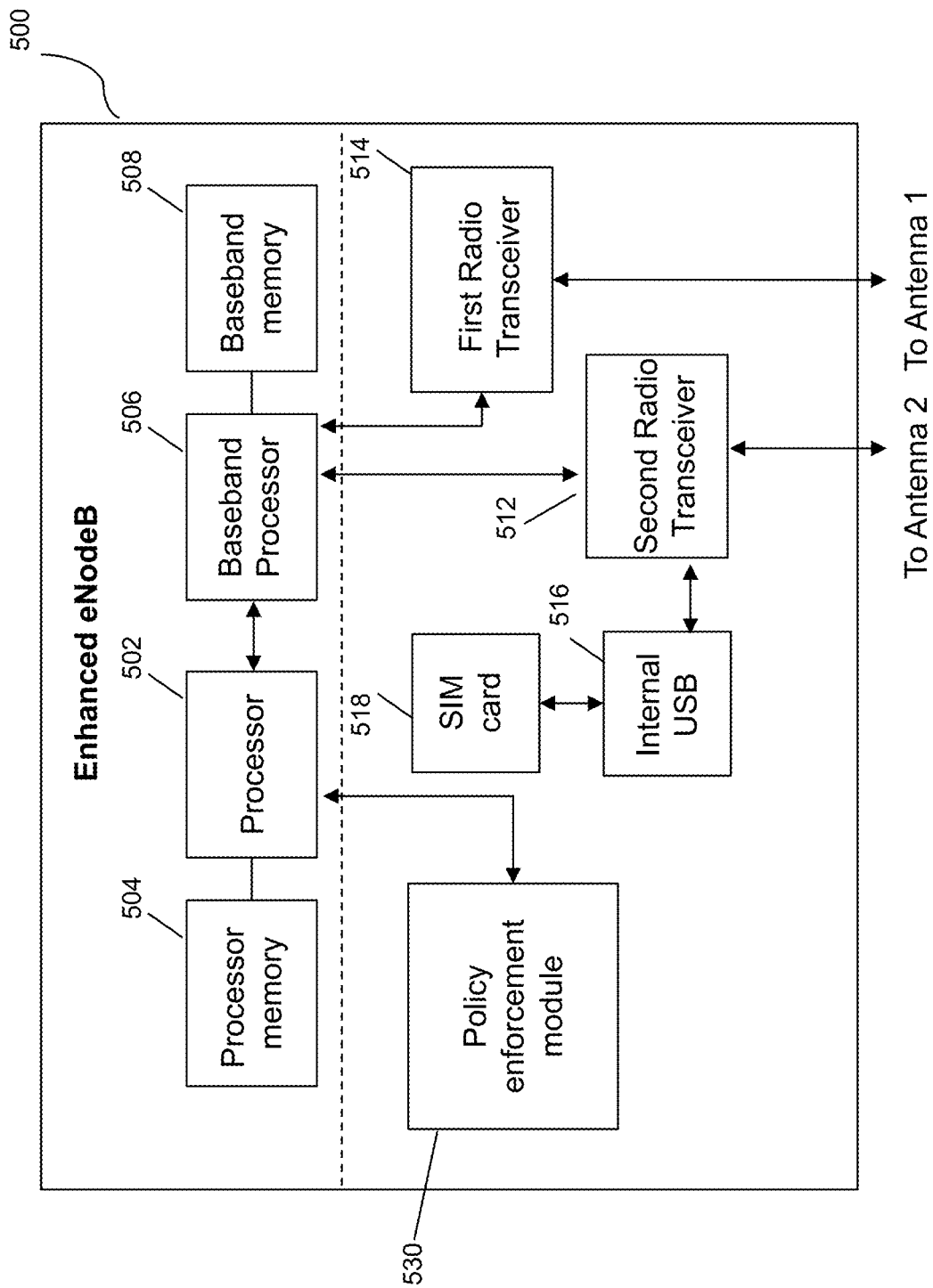
FIG. 5 is a schematic diagram of an enhanced base station, in accordance with some embodiments.

FIG. 5 is a schematic diagram of an enhanced base station, in accordance with some embodiments. Enhanced base station 500 may be an eNodeB for use with LTE, and may include processor 502, processor memory 504 in communication with the processor, baseband processor 506, and baseband processor memory 508 in communication with the baseband processor. Enhanced eNodeB 500 may also include first radio transceiver 514, which is a Wi-Fi transceiver, and second radio transceiver 512, which is an LTE transceiver; enhanced eNodeB 500 is thus a multi-radio access technology (multi-RAT) node. Enhanced eNodeB 500 may also include internal universal serial bus (USB) port 516, and subscriber information module card (SIM card) 518 coupled to USB port 516. In some embodiments, the second radio transceiver 512 itself may be coupled to USB port 516, and communications from the baseband processor may be passed through USB port 516. Transceiver 514 is connected to Antenna 1, which provides Wi-Fi antenna functionality, and transceiver 512 is connected to Antenna 2, which provides LTE transmit and receive antenna functionality. Wi-Fi radio transceiver 514 may provide, e.g., IEEE 802.11a/b/g/n/ac functionality or other Wi-Fi functionality. In some embodiments, Wi-Fi transceiver and Antenna 1 may provide multiple-in, multiple-out (MIMO) functionality. LTE transceiver 512 may be a user equipment (UE) modem. In other embodiments, a UE modem may be connected via a USB bus.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Either transceiver may be coupled to processor 502 via a Peripheral Component Interconnect-Express (PCI-E) bus, and/or via a daughtercard. As transceiver 512 is for providing LTE UE functionality, in effect emulating a user equipment, it may be connected via the same or different PCI-E bus, or by a USB bus, and may also be coupled to SIM card 518.

SIM card 518 may provide information required for authenticating the simulated UE to the evolved packet core (EPC). When no access to an operator EPC is available, local EPC 520 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

In some embodiments, wireless radio coverage (i.e., access) to user devices may be provided via Wi-Fi radio transceiver 514. In some embodiments, an additional radio transceiver capable of providing LTE eNodeB functionality (not shown) may be provided, and may be capable of higher power and multi-channel OFDMA for providing access.

Processor 502 may be configured to provide eNodeB, nodeB, BTS, base station, access point, and/or other functionality.

Wireless backhaul or wired backhaul may be used. Wired backhaul may be an Ethernet-based backhaul (including Gigabit Ethernet), or a fiber-optic backhaul connection, or a cable-based backhaul connection, in some embodiments. Wireless backhaul may be provided using an LTE connection, using LTE UE modem 512. Additionally, wireless backhaul may be provided in addition to wireless transceivers 510 and 512, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 502 for reconfiguration.

A policy enforcement module 530 may be provided in communication with processor 502. This policy enforcement module 530 may provide PCEF functions, in conjunction with a coordinating node, as further described herein, in some embodiments. Module 530 may communicate with the coordinating node via the backhaul connection. Module 530 may receive rules from the coordinating node. Module 530 may include SPI or DPI inspection modules that run on the processor; a packet processor may also be provided.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may execute on the general purpose processor 502.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 510 and 512. Baseband processor 506 may use memory 508 to perform these tasks.

Figure 6:
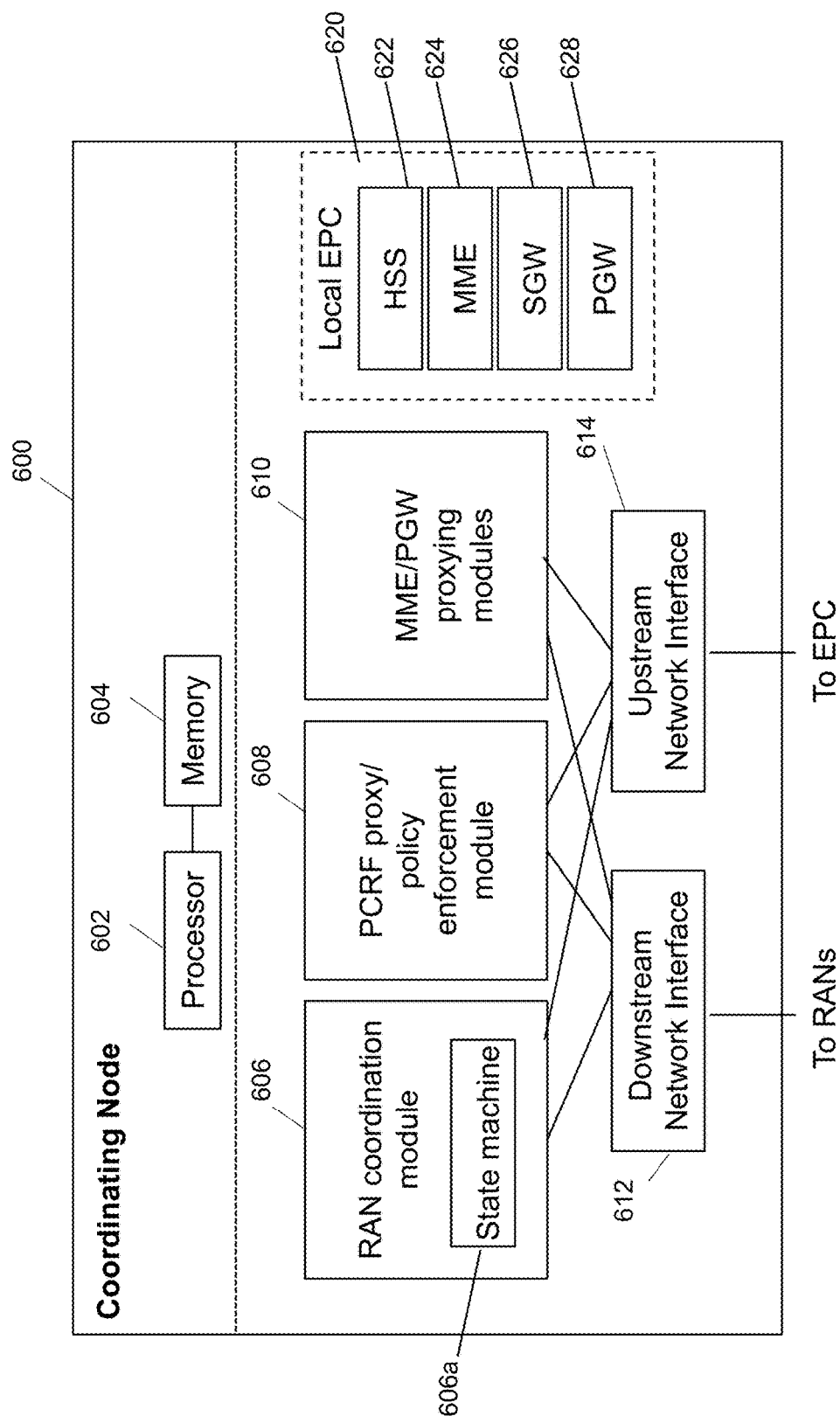
FIG. 6 is a schematic diagram of a coordinating node, in accordance with some embodiments.

FIG. 6 is a schematic diagram of a coordinating node, in accordance with some embodiments. Coordinating node 600 includes processor 602 and memory 604, which are configured to provide the functions described herein. Also present are radio access network coordination/signaling (RAN Coordination and signaling) module 606, PCRF proxy/policy enforcement module 608, and MME/PGW proxying module 610. In some embodiments, coordinator server 600 may coordinate multiple RANs using coordination module 606. In some embodiments, coordination server may also provide proxying, routing virtualization and RAN virtualization. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). Policy enforcement functions described herein may be provided at module 608. Policy enforcement module 608 may also communicate over a Gx interface with a PCRF in the core network via upstream network interface 614.

Coordinating node 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local PGW 628 may provide functions as described elsewhere herein. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

Coordinating node 600 may be a pass-through gateway for data tunnels, forwarding data through to a core network. Coordinating node 600 may also provide encryption functions, e.g., using IPsec for encrypting or decrypting data for forwarding over one or more bearers to the core network, and may have access to unencrypted data thereby. In the case that Wi-Fi is used at one or more base stations to provide access to user devices, the coordinating node may be a trusted wireless access gateway (TWAG) or evolved packet data gateway (ePDG), providing the ability for the Wi-Fi user devices to participate in and join the operator network. In some cases, the coordinating node may also provide LIPA or SIPTO IP offload gateway capability. In some cases, coordinating node 600 may be a home eNodeB gateway (HENBGW). Because the built-in QCI and TOS mechanisms used by the methods described herein are passed through by IPsec, GTP-U, and other tunneling protocols, these quality of service (QOS) parameters are preserved by the coordinating node 600.

Further Embodiments

While a coordinating node is shown in this embodiment, the described method may be used without a coordinating node, e.g., in a standard LTE core network where eNodeBs are connected directly to an operator core network. Alternatively, in some embodiments, the functions and steps described herein may be split among the eNodeB/multi-RAT node and coordinating node, or to a gateway node in a mesh or mixed-backhaul configuration that is providing backhaul to other nodes.

In some embodiments, the radio transceivers described herein may be for base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment. Those of skill in the art will recognize that small cells, macro cells, wireless access points, femto gateways, etc. may all benefit from the methods described herein.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A system for providing configurable flow management, comprising:
    a first base station coupled to a user device and with an established control connection with the user device;
    a coordinating node coupled to the first base station and coupled to a core network, thereby providing a gateway for the first base station and the user device to the core network, the core network further comprising a policy and charging rules function (PCRF) node with a database of policy rules; and
    a PCRF proxy at the coordinating node for caching and delivering policy rules, wherein the coordinating node is configured to retrieve policy rules from the PCRF node, to enable enforcement of retrieved policy rules on flows from the user device passing through the coordinating node, and to transmit policy rules to the first base station for enforcement at the first base station, and wherein PCRF rules are cached at the coordinating node and periodically synchronized with the PCRF node, wherein the PCRF proxy is co-located with the coordinating node and alerts the coordinating node when the PCRF rules should be updated such that other existing PCRFs do not need to be updated to handle additional queries.

2. The system of claim 1, wherein the first base station is capable of at least one of a 2G air interface, a 3G air interface, or a 4G air interface.

3. The system of claim 1, wherein the PCRF node is located at a 4G long term evolution (LTE) packet data network gateway (P-GW).

4. The system of claim 1, wherein enforcement is performed at the first base station and wherein the first base station receives policy rules via the coordinating node.

5. The system of claim 1, wherein enforcement is performed at the first base station and wherein the policy rules include one or more of: sending machine-to-machine (M2M) traffic to a M2M server; sending traffic destined for a particular URL or IP or IP network to an IP offload server.

6. The system of claim 1, wherein enforcement is performed at a second base station coupled to the first base station via a mesh network, and wherein the second base station is configured to receive an enforcement rule via the coordinating node.

7. The system of claim 1, wherein enforcement of a flow originated via a second base station is performed at the first base station, the second base station coupled to the first base station via a mesh network.

8. The system of claim 1, wherein enforcement is performed at the coordinating node.

9. The system of claim 1, wherein the coordinating node is further configured to perform deep packet inspection.

10. The system of claim 1, wherein the coordinating node is further configured to enable matching of the retrieved policy rules for a flow using one or more of source address, source port, destination address, destination port, destination uniform resource locator, and protocol.

11. The system of claim 1, wherein the coordinating node is further configured to enable enforcement of the retrieved policy rules for a flow using source address, source port, destination address, destination port, uniform resource locator (URL), access point name (APN), and protocol.

12. The system of claim 1, wherein the coordinating node is further configured to enable enforcement of the retrieved policy rules using an access point name.

13. The system of claim 1, wherein the coordinating node is further configured to enable enforcement of the retrieved policy rules to cause redirection of a packet flow from the first base station via local IP access (LIPA) or selected IP traffic offload (SIPTO) or a gateway to the public Internet.

14. The system of claim 1, wherein the coordinating node is further configured to enable enforcement of the retrieved policy rules to cause redirection of a packet flow from the first base station to a mobile edge computing node or to a media caching node.

15. The system of claim 1, wherein the retrieved policy rules are static rules, dynamic rules, pattern-matching rules, or heuristic rules.

16. The system of claim 1, further comprising enforcing a policy rule to change one or more of: modulation; scheduling; and transmit power at the first base station.

17. The system of claim 1, further comprising reducing latency for performing policy enforcement by enforcing policy rules at the first base station.

18. A system for providing configurable flow management, comprising:
a first base station communicatively coupled to a user device and with an established control connection with the user device, the first base station further comprising a policy control and charging enforcement function (PCEF) with a database of policy rules;
a PCRF proxy caching and delivering policy rules and
wherein the PCEF is configured to retrieve policy rules from a coordinating node acting as a gateway to a core network, the coordinating node further configured to retrieve policy rules from a policy charging and rules function (PCRF) in the core network, to enable enforcement of retrieved policy rules on flows from the user device passing through the first base station, and wherein PCRF rules are cached at the coordinating node and periodically synchronized with the PCRF node, wherein the PCRF proxy is co-located with the coordinating node and alerts the coordinating node when the PCRF rules should be updated such that other existing PCRFs do not need to be updated to handle additional queries.

* * * * *